United States Patent [19]

Merten et al.

[11] Patent Number: 5,641,058

[45] Date of Patent: Jun. 24, 1997

[54] METHOD AND A DEVICE FOR TENSIONING ENDLESS DRIVE BELTS

[75] Inventors: Gerhard Merten, Lünen; Bernd-Christian Pago, Olfen; Jens Titschert, Lünen, all of Germany

[73] Assignee: Westfalia Becorit Industrietechnik GmbH, Germany

[21] Appl. No.: 422,123

[22] Filed: Apr. 11, 1995

[30] Foreign Application Priority Data

Apr. 16, 1994 [DE] Germany .................. 44 13 321.9

[51] Int. Cl.$^6$ .................................................. B65G 15/00
[52] U.S. Cl. ............................ 198/810.04; 198/813
[58] Field of Search ........................ 198/810.01, 810.04, 198/811, 813, 866; 74/101, 110

[56] References Cited

U.S. PATENT DOCUMENTS

| 1,663,344 | 3/1928 | Lennard | 198/810.04 |
| 4,470,355 | 9/1984 | Kunczynski | 198/813 X |

FOREIGN PATENT DOCUMENTS

| 2457790 | 6/1976 | Germany . | |
| 2606699 | 8/1977 | Germany . | |
| 3502664 | 1/1987 | Germany . | |
| 3905803 | 8/1990 | Germany . | |
| 3923321 | 1/1991 | Germany . | |
| 3841884 | 1/1993 | Germany . | |
| 3927892 | 2/1993 | Germany . | |
| 293318 | 10/1992 | Japan | 198/813 |

OTHER PUBLICATIONS

Experience in Operating Chain Pre-Stress Regulators and DTP Couplings (Gluckauf, 1992, pp. 189–193).
Automatic Pre-Stress Regulation for Chain Conveyor and Planing System (Gluckauf, 1986, pp. 871–874).

*Primary Examiner*—Frank E. Werner
*Attorney, Agent, or Firm*—Vickers, Daniels & Young

[57] ABSTRACT

The invention employs pressure and displacement sensors for the automatic monitoring and adjustment of the pretension of endless belts, in the form of chains or the like, which sensors determine the pressure in the cylinder space and the movement of the piston of the tensioning cylinder, and the measuring signals from which sensors are evaluated by an electronic evaluation and actuation unit. In this respect the evaluation and actuation unit calculates from the measuring signals the changes in pressure which occur over a predetermined partial stroke of the piston of the tensioning cylinder, wherein these changes in pressure reflect the state of tension of the chain belt. When the chain tension is incorrect, the evaluation and actuation unit can therefore control the tensioning cylinder so that the optimum chain tension is set automatically.

12 Claims, 1 Drawing Sheet

METHOD AND A DEVICE FOR TENSIONING ENDLESS DRIVE BELTS

TECHNICAL FIELD

This invention relates to a method of automatically monitoring and adjusting the pre-tension of endless drive belts circulating over drive and return wheels or the like, particularly of drive belts in the form of chains, primarily as in scraper chain conveyors and cutter or plough installations, with the use of a tensioning drive having at least one hydraulic tensioning cylinder for altering the distance setting of the drive and return wheels. The invention also relates to a device for carrying out the method.

The invention is preferably directed towards a method and a device for tensioning the endless chains of heavy-duty chain drives, primarily as in scraper chain conveyors, cutter or plough installations and the like, which are used in underground mining for winning of coal or the like, and the invention is described in detail below in this connection. However it is to be understood that the invention can be used generally for the monitoring and automatic adjustment of endless drive belts circulating over drive and return wheels or the like, e.g. in belt conveyors.

In the scraper chain conveyors which are used as face conveyors in mining longwall operations, and in the known plough installations also, the driven chain (scraper chain, plough chain) has to maintain the optimum possible chain pre-tension so as to permit perfect, malfunction-free operation of this operating means with the lowest possible wear. A chain pre-tension which is too low leads to chain sag, which can result in chain noise (intertwisting or interlocking of the chain links) and to the chain belts becoming out of alignment and meshing with the chain wheels. This can cause damage, or may even result in breakages of the chain belt, of chain deflectors or of the chain wheels. A chain pre-tension which is too high leads to an undesirably high output demand on the chain drives, and consequently results in fatigue of the chain belt and also in increased wear on the chain belt and chain wheels.

When the aforementioned operating means (scraper chain conveyor, plough installations, or the like) are in continuous operation, the magnitude of the chain pre-tension to be selected is primarily determined by the maximum operating forces occurring in normal operation. However, the chain pre-tension which is set each time is subjected to considerable changes in operation. The changes are determined, for example, by the changing course of the curve of the conveyor trough when moving the scraper chain conveyor against the coal face. Jamming of the chains can result in permanent stretching of the chains. The respective loading of the face conveyor also leads to an increase in chain pre-tension. Moreover, in operational use the requirement exists of being able to effect an adaptation of the chain pre-tension irrespective of the various effects or quantities influencing the latter.

It is known that chain drives can be fitted with tensioning drives by means of which the distance between the drive and return wheels can be altered and the chain tension can thus be adjusted. Known tensioning devices for scraper chain conveyors and plough installations employ hydraulic cylinders for this purpose, by means of which the chain wheel can be adjusted at the driving end and/or at the return end (main or auxiliary drive) in the direction of tensioning and in the opposite direction. In scraper chain conveyors, conveyor troughs or machine frames which can be adjusted telescopically by means of tensioning cylinders are used for this purpose, or the drive wheel of the endless scraper chain is mounted in the machine frame so that it is displaceable in the tensioning direction and in the opposite direction, at least one hydraulic tensioning cylinder being disposed in the machine frame (DE-OS 39 23 321, DE-OS 39 05 803, DE-OS 24 57 790, DE-PS 26 06 699). In this connection it is also known that automatic chain tensioning control can be employed. In the latter, the chain conditions at the main and auxiliary drives are determined by means of sensors, the respective chain sag being measured at the main drive and the chain geometry in the upper run being measured at the auxiliary drive; this is effected by means of appropriate sensors. The signals supplied by the sensors provide information on the respective state of tensioning of the chain. The measuring signals are processed by an evaluation and actuation unit and utilised to control the chain pre-tension by means of the actuated tensioning cylinder drive (DE-PS 35 02 664, DE-PS 39 27 892, DE-PS 41 884, the journal "Glückauf" [Good Luck] 1992, pages 189–193, the journal "Glückauf" 1986, pages 871–874). The known chain tensioning control systems, which are equipped with sensors disposed on the machine frame or on the conveyor trough which determine the chain sag or other chain condition, and which have to be balanced with each other, necessitate considerable expenditure. Another disadvantage is that re-tensioning of the chain is only possible in continuous operation if a considerable degree of chain slack has already formed, which can be detected by the sensors.

OBJECT OF THE INVENTION

The object of the present invention is primarily to provide a method and a device by means of which the instantaneous tension of the drive belt or chain(s) can be reliably determined, even in continuous operation, using simple means and without the use of the sensors which were previously necessary for determining chain sag, wherein the tension can also be adjusted or re-adjusted in the optimum manner.

SUMMARY OF THE INVENTION

This object is achieved by means of the method according to the invention in that monitoring of the state of tensioning and automatic adjustment of the pre-tension of the drive to the scheduled value is effected with the use of pressure and displacement sensors associated with the tensioning cylinder, in accordance with the change in pressure which occurs in the tensioning cylinder space when there is a defined partial stroke of the tensioning cylinder piston.

The invention is based on the consideration that the state of tension of a chain, or of another type of driven endless belt, both in the inoperative state and in the driven state, can be reliably determined in that the piston of the tensioning cylinder or cylinders is hydraulically adjusted or moved in the cylinder by a defined partial stroke, e.g. in the direction of tensioning, and that the pressure or the change in pressure in the cylinder space is measured simultaneously with this piston movement, wherein the monitoring measurement which is thus made will contain reliable information on the state of tension of the chain or of the drive belt, which can be utilised both for monitoring the state of tension and also for automatically setting the optimum chain tension (scheduled tension). For example, if the chain is insufficiently tensioned and if chain sag is present at the main or auxiliary drive, the pressure in the tensioning cylinder space does not change or changes only slightly during the movement of the piston over the measuring section (partial stroke of the piston), since the tensioning cylinder here is only tensioning out the existing chain sag, and therefore does not have to work against the pre-tensioned chain. On the other hand, if the chain is too taut, i.e. is tensioned more highly than corresponds to the optimum pre-tension, the piston movement during the monitoring measurement, i.e. during the predetermined partial stroke of the piston, leads to a very large change in pressure and therefore to a large pressure increase or pressure drop in the cylinder space of the tensioning cylinder, since in this case the tensioning cylinder has to work against the chain which is already excessively tensioned. The respective state of the chain tension can therefore reliably be determined via the measurement of the pressure in the tensioning cylinder during the piston movement. This merely requires the use of proven pressure and displacement sensors which are widely employed, primarily in mining. Expensive sensors for the determination of chain sag and the like, which have to be separately accommodated in the machine frame, are not required. Rather, the requisite pressure and displacement sensors can be used as components which are integrated with the tensioning cylinder.

The determination of the change in pressure in the tensioning cylinder space during a predetermined partial stroke of the piston by the electronic evaluation and actuation unit not only permits reliable monitoring of the state of the chain tension at the main and/or auxiliary drive to be effected, both when these are switched off and also with the chain in its operating driven state, but also permits an automatic alteration or readjustment of the pre-tensioning force to be made simultaneously in continuous operation, if need be. It is therefore possible to effect automatic adjustment of the tensioning drive or automatic control of the pre-tension with high precision and substantially free from delay. This can be achieved more advantageously in that the state of tension of the drive belt or of the driven chain is constantly monitored in continuous working operation by monitoring measurements made continuously or at successive time intervals by the evaluation and actuation unit, and when the state of tension differs from the scheduled value the state of tension is brought back to the scheduled value, i.e. to the optimum chain tension. In this respect, the procedure may be such that the changes in pressure in the tensioning cylinder space are compared as actual values with a scheduled value which is predetermined in the evaluation and actuation unit, wherein if there is a deviation from the scheduled value the tensioning cylinder is actuated by the evaluation and actuation unit in the sense of an extension or retraction, in order to adjust the chain tension to the scheduled value. This procedure, which employs an actual value/scheduled value comparison, thus permits automatic control of the pre-tension. The monitoring measurements may be made by the evaluation and actuation unit at time intervals which are preset in it, the evaluation and actuation unit being equipped with a timing unit or the like. On the other hand, a simple procedure may be employed, in which when there is a change in pressure in the tensioning cylinder space caused by a change in chain tension the evaluation and actuation unit is activated due to the pressure measurement signal supplied, so that it actuates the tensioning cylinder in its direction of extension or retraction for the exertion of a pressure and the change in pressure in the tensioning cylinder space which occurs on the movement of the piston is thereby determined and the change in pressure calculated over the partial stroke of the piston is used for the adjustment of the state of tension of the chain to its scheduled value.

In this respect, the tensioning operation can be terminated by the evaluation and actuation unit when the value of the change in pressure calculated by it based on the pressure and displacement measuring signals has reached a value corresponding to the optimum chain tension. If it is shown during the piston movement of the tensioning cylinder that this movement takes place without a significant pressure increase in the cylinder space which is acted upon, and that a "chain sag" situation therefore exists, the piston movement can accordingly be continued in the sense of tensioning the chain and thus of eliminating the chain sag until the measuring signals from the pressure and displacement sensors indicate to the evaluation and actuation unit that a pressure increase corresponding to the required chain tension, i.e. to the scheduled value of the chain tension, has been reached in the tensioning cylinder space, and further tensioning of the chain is consequently prevented by corresponding actuation of the tensioning cylinder. The same applies analogously when a chain tension which is too taut exists. This is indicated at the evaluation and actuation unit by a corresponding pressure increase in the tensioning cylinder space, so that the tensioning cylinder is then controlled by the evaluation and actuation unit in the sense of reducing the chain tension to the scheduled value.

A mode of operation is also possible according to the invention in which the piston of the tensioning cylinder, which is controlled by the evaluation and actuation unit, is moved continuously or discontinuously by a predetermined partial stroke, this piston movement being effected by the electronic evaluation and actuation unit by its correspondingly actuating the electrohydraulic valves disposed in the pressure medium lines. The changes in cylinder pressure which occur on the movements of the partial stroke are determined with the aid of the computer of the evaluation and actuation unit, so that the tensioning cylinder is controlled in the sense of the optimum chain tension in accordance with the determined change in pressure for each value of the change in stroke. By means of a continuous, monitored, reciprocating movement of the tensioning cylinder piston it can be ensured that the optimum chain tension is always set, irrespective of the respective drive outputs of the chain drives, the efficiencies, and of the coefficients of friction also.

The method according to the invention can be carried out with a device which is provided with a tensioning drive for tensioning the endless drive belt (chain belt) by altering the distance between its drive and return wheels or the like, wherein the tensioning drive comprises at least one hydraulic tensioning cylinder. In this connection, sensors are provided for determining the respective state of tension, the measuring signals of which are processed by an electronic evaluation and actuation unit in the sense of a controlled extension or retraction of the tensioning cylinder or cylinders. According to the invention, the sensors consist of pressure and displacement sensors associated with the tensioning cylinder, which measure the pressure in the tensioning cylinder space and the piston stroke of the tensioning cylinder. In this respect, the electronic evaluation and actuation unit is provided with a computer for determining the change in pressure in the tensioning cylinder space over a predetermined piston displacement (partial stroke of the piston) of the tensioning cylinder. At the same time it comprises an apparatus for actuating the tensioning cylinder in accordance with the calculated changes in pressure in the sense of setting the scheduled value of the tension, i.e. setting the optimum chain tension. The evaluation and actuation unit may optionally also be provided with a timing unit which makes the monitoring measurements automatically at predetermined time intervals, in order to monitor the chain tension at predetermined time intervals. The electronic evaluation and actuation unit may also be provided with a program register for storing the respective scheduled value of the tension of the drive belt or of the chain. In this situation, automatic control of the pre-tension can be employed.

As mentioned above, the said pressure and displacement sensors may be disposed on or in the tensioning cylinders. The same applies to the electronic evaluation and actuation unit. The tensioning cylinder is actuated via electromagnetic valves, which may also be disposed on the tensioning cylinder.

On a chain conveyor, the tensioning drive may be disposed on a telescopic trough of the same, on a telescopic machine frame, or in a non-telescopic machine frame, wherein in the last-mentioned case the chain drum is guided between the side cheeks of the machine frame so that it is displaceable in the direction of tensioning and in the opposite direction. The possibility also exists of providing a tensioning device having a controlled tensioning cylinder at each end of the drive belt or of the chain.

BRIEF DESCRIPTION OF THE DRAWINGS

The invention is further described below with reference to an example of an embodiment which is illustrated in the drawings, where.

DETAILED DESCRIPTION

Figure 1:
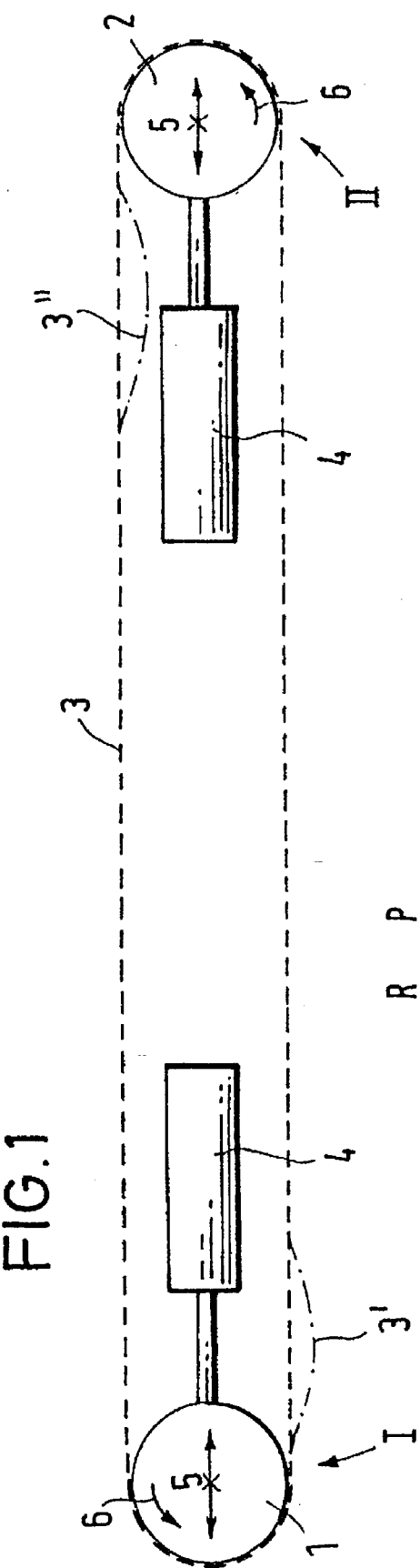
FIG. 1 is an extremely simplified, schematic illustration of a chain drive having a tensioning drive for tensioning the chain.

FIG. 1 is a simplified, schematic illustration of the endless chain belt 3 which circulates over drive and return wheels 1 and 2. In a scraper chain conveyor this chain belt forms the endless scraper chain belt circulating in the conveyor trough, and in a plough installation it forms the plough chain, which is attached to the plough in the usual manner. In a scraper chain conveyor which is used as a face conveyor, the chain wheel 1, which is constructed as a chain drum, is situated in the machine frame of the conveyor at what is termed the main drive station I, whilst the chain wheel 2 disposed at the other end of the conveyor forms what is termed the auxiliary drive station II with its machine frame and drive. The chain wheel drives at the main drive I and at the auxiliary drive II are not shown. It is also possible to provide the chain drive at the main drive station I only, however.

In order to tension the chain belt 3 the main drive station I and/or the auxiliary drive station II is constructed as a tensioning station which comprises at least one hydraulic tensioning cylinder 4, by means of which the associated chain wheel 1 or 2 can be adjusted in the direction of the double arrow 5, so as to be able to set the optimum pre-tension at the chain belt 3. In this respect the chain wheels 1 and 2 can be guided in the respective machine frame so that they are displaceable in the direction of the arrow 5, as is known. Alternatively, the machine frame which receives the chain wheels 1 and 2 may also be constructed as a telescopic frame which can be moved telescopically by means of the tensioning cylinder 4, however, as is also known. Above all it is essential that the adjustment of the chain pre-tension to its prescribed value is effected by altering the distance between the chain wheels 1 and 2.

An optimum course of the chain is obtained when, during continuous operation, the chain 3 is neither sags to an inadmissible extent at the drive or in the region of circulation around the chain wheels 1 and 2, nor is excessively highly tensioned irrespective of the various operating influences, of which the instantaneous drive output of the chain drive or drives also form part. In order to achieve the optimum chain tension for each operating situation during operation, constant or repeated monitoring and automatic adjustment or re-adjustment of the chain tension is effected in continuous operation by the corresponding control or regulation of the tensioning drive or drives or of their hydraulic tensioning cylinders 4.

The direction of rotation of the chain wheels 1 and 2 is indicated in FIG. 1 by the arrows 6. It can be seen that so-called chain sag 3' in the lower run of the chain belt can form at the chain wheel 1 of the main drive station as the chain 3 moves away from this chain wheel, whilst at the auxiliary drive station chain sag 3" such as this can form in the upper run. On the formation of chain sag 3" in the upper run, the chain tensioning force in the lower run of the chain, and thus the pressure in the tensioning cylinder 4, is proportional to the delivered output of the chain drive at the auxiliary drive, according to the relationship:

$$P = L \cdot \frac{\eta}{V_k}$$

where

P is the tensioning cylinder pressure,

L is the output or power of the chain drive $\eta$ is the efficiency of the chain drive, and $V_k$ is the chain speed.

If the tensioning cylinder 4 at the main drive station I is acted upon hydraulically in the direction of tensioning when chain sag 3" exists, i.e. in its direction of extension in the embodiment illustrated, the pressure P in the tensioning cylinder space only changes very slightly. Slight changes in pressure may be caused by frictional and inertial forces in the machine frame.

However, if the tensioning cylinder 4 is acted upon hydraulically in its direction of extension or retraction when the chain 3 is too taut, very large changes in chain force are produced during the piston stroke of the tensioning cylinder, and very large changes in the pressure P in the tensioning cylinder space are correspondingly produced. These can be approximated by the relationship:

$\Delta F = c \cdot \Delta l$ $\Delta l$: the change in piston stroke of the tensioning cylinder c: the spring constant from the upper and lower run of the chain belt $\Delta F$: the change in chain force for a change in stroke of $\Delta l$.

It follows from the above that the state of tensioning of the chain belt 3 can be reliably determined by linking the physical quantities P (pressure in the cylinder space of the tensioning cylinder) and $\Delta l$ (change in stroke of the tensioning cylinder), i.e. the presence of chain sag or a chain tension which is too taut can be determined with certainty. The pressure in the cylinder space of the tensioning cylinder 4 and the stroke of its piston can be simply and reliably measured by means of the pressure and displacement sensors which are widely used in mining.

Figure 2:
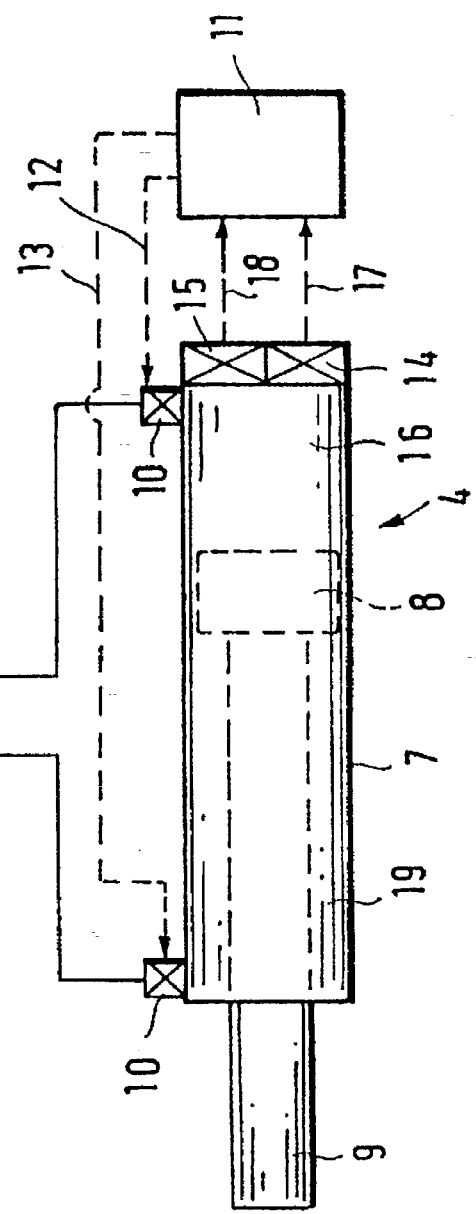
FIG. 2 illustrates, also in simplified, schematic form, a single tensioning cylinder with the associated pressure and displacement sensors, and the electronic evaluation and actuation unit.

FIG. 2 is a simplified schematic illustration, on a larger scale, of an individual tensioning cylinder 4 with its cylinder part 7 and with the piston 8 and piston rod 9 guided therein. The tensioning cylinder 4 is connected to a high-pressure hydraulic line P and to a hydraulic return line R. Electromagnetic valves 10 are disposed in these lines, and can be switched by an electronic evaluation and actuation unit 11 via electrical actuating lines 12 and 13. The solenoid valves 10 may be installed directly on the tensioning cylinder 4, but may also be installed separately from the tensioning cylinder, in the hydraulic lines P and R. A pressure sensor is denoted by 14 and a displacement sensor is denoted by 15. The two sensors 14 and 15 are integrated with the tensioning cylinder. They may be situated at the base of the tensioning cylinder and/or on its piston 8 or piston rod 9. Hydraulic cylinders which are equipped with pressure and displacement sensors are known in mining, so that further description of the construction and arrangement of these sensors is unnecessary. The pressure sensor 14 measures the hydraulic pressure in the tensioning cylinder space 16. The electrical pressure signals which is supplies are fed via the signal line 17 to the evaluation and actuation unit 11. The displacement sensor 15 measures the stroke of the piston 8 of the tensioning cylinder, and its electrical displacement signals are fed via the signal line 18 to the electronic evaluation and actuation unit 11. It is to be understood that the evaluation and actuation unit 11 can also be combined with the tensioning cylinder to form a modular unit.

The procedure to be employed in order to determine the state of tensioning of the chain belt 3 by way of a monitoring measurement may be such that the tensioning cylinder space 16 is acted upon by hydraulic pressure from the pressure line P, whilst the annular tensioning cylinder space 19 situated on the opposite side of the piston 8 is connected to the return line R. This is effected by the evaluation and actuation unit 11, which opens the electromagnetic valves 10 via the actuating lines 12 and 13. When the tensioning cylinder space 16 is pressurised, the piston 8 executes a piston movement in the direction of extension of the tensioning cylinder and its piston rod 9. The piston stroke is determined by the displacement sensor 15 and is fed as a measuring signal to the evaluation and actuation unit 11. As mentioned above, the pressure in the tensioning cylinder space 16 changes only slightly when chain sag 3' or 3" is present in the chain belt 3, whilst if the tension of the chain belt 3 is too taut a very large pressure increase over the travel of the piston is recorded in the tensioning cylinder space 16. The pressure measurement signals are fed via the signal line 17 to the evaluation and actuation unit. The later comprises an electronic computer, which calculates the change in pressure in the tensioning cylinder space 16 for a predetermined piston travel, and therefore for a partial stroke of the piston, from the measuring signals supplied by the pressure and displacement sensors 14, 15. The state of tensioning of the chain is thus known at the evaluation and actuation unit 11, so that if the chain tension is incorrect the evaluation and actuation unit can control the tensioning cylinder 4 in its direction of extension or retraction, by a corresponding actuation of the tensioning cylinder via the actuating lines 12 and 13, so that the optimum chain tension is set.

When there is automatic chain tension monitoring and chain tension adjustment, the piston 8 of the tensioning cylinder 4 may be moved by a defined piston stroke, controlled by the electronic evaluation and actuation unit 11, either continuously or at predetermined time intervals. The changes in pressure which occur in the tensioning cylinder pressure space during these piston movements for each change in stroke, $\Delta P/\Delta l$, i.e. for each partial stroke of the piston, are determined by means of the computer of the evaluation and actuation unit 11, as mentioned above. If the magnitude of the change in pressure for each partial stroke ($\Delta P/\Delta l$) is very low, and the "chain sag" state is thus signalled, the evaluation and actuation unit 11 controls the tensioning cylinder 4 in the direction of tensioning, i.e. in the direction of extension in the embodiment illustrated. However, if the change in pressure in the tensioning space over the partial stroke of the piston 8 is very large, the tensioning cylinder 4 is controlled by the evaluation and actuation unit 11 in the sense of slackening the chain and setting the chain tension to its scheduled value. In the embodiment illustrated this is accomplished by pressurising the tensioning cylinder in its direction of retraction. By means of a stroke movement of the piston 8 in partial strokes, which are executed either continuously or at time intervals, it can thus be ensured that the optimum chain tension is always set, irrespective of the various disturbing influences, such as different drive outputs, coefficients of friction and efficiencies. When the chain drive is in continuous operation, the piston 8 can execute a constant, controlled reciprocating movement by corresponding actuation of the tensioning cylinder, so as firstly continuously to monitor the state of tension of the chain belt 3 and secondly to re-adjust the latter if any deviations from the optimum state of tension exist. The system operates substantially free from inertia and with a sufficiently high accuracy.

The state of tension of the chain 3 can also be determined in the manner described when the chain drive has stopped. It is recommended that the state of tension of the chain 3 is checked by monitoring measurements before switching on the chain drive (s) and is set to the tension value which is the optimum for the starting operation.

The device described above can also operate with automatic pre-tension control. In this respect, the electronic evaluation and actuation unit 11 comprises a program register in which the scheduled values of the chain tension are stored. The computer of the evaluation and actuation unit 11 determines the changes in pressure occurring over a partial stroke of the piston in the tensioning cylinder space from the measuring signals of the pressure and displacement sensors 14, 15, as described above. These changes in pressure are determined as instantaneous actual values. The chain tension is then adjusted to the scheduled value by means of an actual value/scheduled value comparison.

By means of the automatic chain tension monitoring and chain tension adjustment described above, particularly when operating with a piston 8 of the tensioning cylinder which is moved in a reciprocating manner, either continuously or at short time intervals, any defective tension in the chain belt 3 is detected immediately and is eliminated by subsequently tensioning or slackening the chain belt without delay.

All publications and patent applications mentioned herein are incorporated by reference to the same extent as if each individual publication or patent application was specifically and individually indicated to be incorporated by reference.

The invention now being fully described, it will be apparent to the skilled man that many changes and modifications can be made thereto without departing from the spirit and scope of the appended claims.

Having thus described the invention, it is claimed:

1. A method of monitoring and adjusting a tension of an endless drive belt circulating over drive and return wheels by a tensioning drive comprising at least one hydraulic tensioning cylinder having a piston movable to alter a distance between the drive and return wheels, said method comprising the steps of:

determining the tension of the endless drive belt by sensors which generate measuring signals;

processing the measuring signals with an electronic evaluation and activation unit; and controlling extension or retraction of the at least one tensioning cylinder by means of the electronic evaluation and actuation unit to adjust the tension of the endless drive to a scheduled value, wherein the determining and adjusting the tension of the endless drive is in accordance with changes in pressure occurring in the at least one tensioning cylinder during movement of the piston, using pressure and displacement sensors associated with the tensioning cylinder.

2. A method according to claim 1, wherein in working operation of the endless drive, the tension of the endless drive belt is monitored by monitoring measurements which are made automatically, continuously or at successive time intervals, by the evaluation and actuation unit.

3. A method according to claim 2, wherein the evaluation and activation unit comprises a computer and the tension of the endless drive is determined as an actual value by the computer via the measuring signals of the pressure and displacement sensors and adjustment to the scheduled value of the tension is effected by way of an actual value/scheduled value comparison by the evaluation and actuation unit.

4. A method according to claim 2, wherein the monitoring measurements for determining the changes in pressure occurring in the at least one tensioning cylinder during the movement of the piston, and the automatic adjustment of the drive to the scheduled value in accordance with these pressure changes, are effected in one operation.

5. In a device for carrying out a method of automatically monitoring and adjusting a tension of an endless drive belt circulating over drive and return wheels comprising the steps of;

determining the tension of the endless drive belt by sensors which generate measuring signals;

processing the measuring signals with an electronic evaluation and actuation unit; and controlling by means of the electronic evaluation and actuation unit the tension of the endless drive belt to a scheduled value, said device comprising;

a tensioning drive for tensioning the endless drive belt by altering the distance between its drive and return wheels, said tensioning drive comprising at least one hydraulic tensioning cylinder having a movable piston;

sensors which determine the tension of the endless drive belt and generate a measuring signal;

and an electronic evaluation and actuation unit for processing the measuring signals of the sensors and which controls the tensioning drive, the improvement comprising pressure and displacement sensors associated with the at least one tensioning cylinder, which measure hydraulic pressure in the at least one tensioning cylinder and the piston movement of the tensioning cylinder, and that the evaluation and actuation unit is provided with a computer for determining the change in pressure in the at least one tensioning cylinder over a predetermined movement of the piston of the at least one tensioning cylinder and for actuating the at least one tensioning cylinder in accordance with the change in pressure, to adjust the tension of the drive belt to the scheduled value.

6. A device according to claim 5, wherein the electronic evaluation and actuation unit is provided with a program register which stores the scheduled value of the tension of the drive belt for automatically controlling the tension.

7. A device according to claim 5, wherein the electronic evaluation and actuation unit is provided with a timing unit which automatically initiates the generation of measuring signals at predetermined time intervals.

8. A device according to claim 5, wherein the pressure and displacement sensors are disposed on or in the at least one tensioning cylinder.

9. A device according to claim 5, wherein the at least one tensioning cylinder can be actuated via electromagnetic valves which can be actuated by the evaluation and actuation unit.

10. A device according to claim 5, for use in a scraper chain conveyor machine, wherein the tensioning drive is disposed substantially inside the machine frame of the scraper chain conveyor and the drive and return wheels consist of chain drums which are displaceable in a tensioning direction and in an opposite direction in the scraper chain conveyor machine.

11. A device according to claim 5, wherein the tensioning drive having at least one tensioning cylinder controlled via the electronic evaluation and actuation unit is disposed at each end of the endless drive.

12. A device for automatically monitoring and adjusting a tension of an endless drive belt circulating over drive and return wheels, said device comprising;

a tensioning drive for tensioning the endless drive belt by altering the distance between its drive and return wheels, said tensioning drive comprising at least one hydraulic tensioning cylinder having a movable piston;

a plurality of sensors which determine the tension of the endless drive belt and generate a measuring signal;

and an electronic evaluation and actuation unit for processing the measuring signals of the plurality of sensors and which controls the tensioning drive, the plurality of sensors including pressure and displacement sensors associated with the at least one tensioning cylinder for measuring hydraulic pressure in the at least one tensioning cylinder and the piston movement of the tensioning cylinder, the evaluation and actuation unit being provided with a computer for determining the change in pressure in the at least one tensioning cylinder over a predetermined movement of the piston of the at least one tensioning cylinder and for actuating the at least one tensioning cylinder in accordance with the change in pressure to adjust the tension of the drive belt to a scheduled value.

* * * * *

UNITED STATES PATENT AND TRADEMARK OFFICE
CERTIFICATE OF CORRECTION

PATENT NO. : 5,641,058
DATED : June 24, 1997
INVENTOR(S) : Merten, et al.

It is certified that error appears in the above-indentified patent and that said Letters Patent is hereby corrected as shown below:

On the title page, item [73]

Delete "Westfalia Becorit Industrietechnik GmbH of Germany" and substitute therefore --DBT Deutsche Bergbau-Technik GmbH of Germany--.

Signed and Sealed this

Sixteenth Day of June, 1998

Attest:

BRUCE LEHMAN

Attesting Officer

*Commissioner of Patents and Trademarks*